Feb. 14, 1928.

G. STROMEIER 1,659,450

DEVICE FOR PREVENTING THE ESCAPE OF OIL FROM JOURNAL AND LIKE BEARINGS

Filed Nov. 21, 1924

INVENTOR
Gustav Stromeier
By Richardson Geier
Attys.

Patented Feb. 14, 1928.

1,659,450

UNITED STATES PATENT OFFICE.

GUSTAV STROMEIER, OF HAMBURG, GERMANY.

DEVICE FOR PREVENTING THE ESCAPE OF OIL FROM JOURNAL AND LIKE BEARINGS.

Application filed November 21, 1924, Serial No. 751,285, and in Germany June 7, 1923.

This invention relates to a device for preventing the escape of oil from bearings, particularly the journal bearings of railway vehicles, tramway vehicles and the like. The means hitherto used for this purpose consisted of discs which were freely mounted on the shaft; these, however, have the disadvantage that when the shaft is stationary the oil which is still on the discs creeps along the shaft and can flow outwardly.

The invention relates to a combination of discs with packing shields in such a manner that only a narrow annular passage remains between the disc and the packing shield, this passage being bridged by the swelling of the oil which is thus formed so that the oil drops are not projected from the rotating disc against the stationary packing shield, but pass directly on to the packing shield and run slowly off this.

Two examples of construction of the invention are shown in the accompanying drawing.

Figure 1:
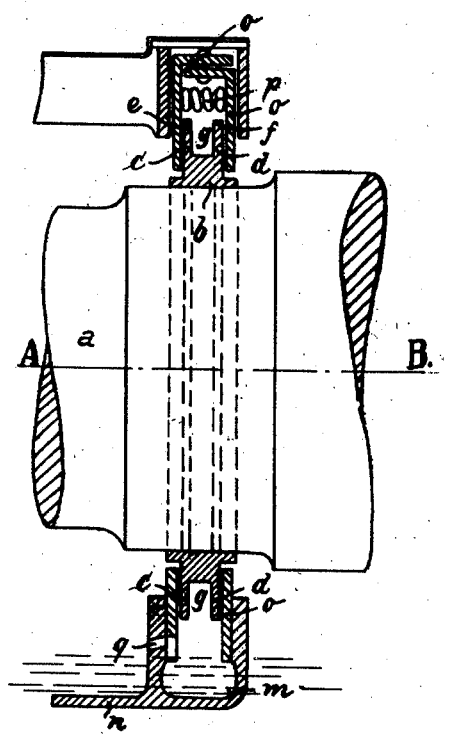
Figures 1 and 3 show respectively a longitudinal section and a section on the line A—B of one form of construction with one oil groove.

To the shaft $a$ is secured a ring $b$ which is provided at its periphery with an oil groove $g$ limited by side walls or flanges $c$ and $d$ (Fig. 1).

Figure 2:
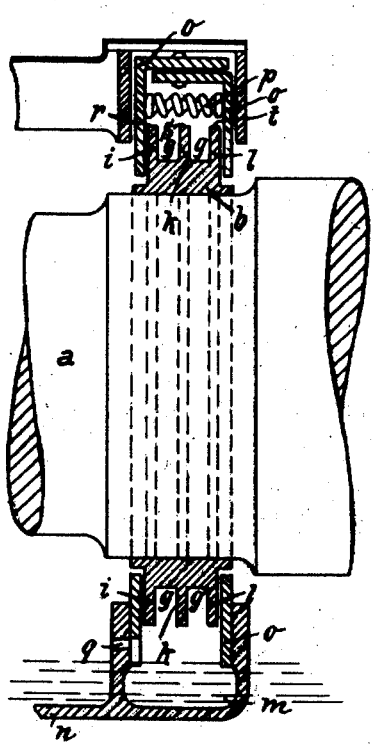
Figure 2 shows a longitudinal section of a form of construction with two oil grooves.
Figure 3:
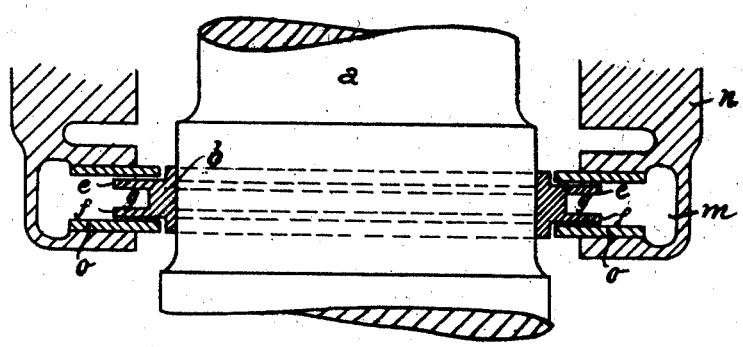

In the form of construction shown in Figure 2 two oil grooves $g$ are provided which are limited by the walls or flanges $i$, $k$ and $l$.

In the collecting chamber $m$ of the journal box $n$ is inserted a packing shield $o$ which serves for guiding the discs or the ring $b$. The inner or outer wall of the shield is pressed against the wall of the packing chamber by means of a number of springs $p$. While the shaft or axle $a$ is rotating the oil in the journal box will be forced upwardly between the inner side portion of the shield $o$ and the adjacent flange $c$ or $i$ and from thence into the groove or grooves $g$, returning into the journal box through the collecting chamber $m$ and opening $q$.

As soon as the shaft comes to rest the oil at the edges $e$ and $f$ or $r$, $s$ and $t$ respectively flows down the inner sides of the walls $c$ and $d$ or $i$, $k$ and $l$ respectively into the grooves $g$ and from here back into the axle box through the chamber $m$. The oil is prevented from being ejected outwardly over the edges $e$ and $f$ or $r$ and $t$ as the oil swelling formed at the edges bridges the narrow space up to the packing shield. The oil then flows downwards on the inner surfaces of the flanges $c$, $d$, $i$, $k$, and $l$, and into the collecting chamber. In the wall of the packing chamber there is provided an opening $q$ so that the oil collecting in the bottom of the packing chamber can flow back into the journal box.

Having now particularly described and ascertained the nature of my said invention and in what manner the same is to be performed, I declare that what I claim is:—

In a device of the character described, the combination of a journal box provided with a closed oil collecting chamber and with an opening leading from said chamber into the interior of said journal box, an axle, an axle ring provided with peripheral flanges defining an intermediate oil receiving groove, and a packing shield having portions extending on opposite sides of said ring in spaced relation thereto to permit the oil to flow between said portions and the sides of said ring when the axle in said journal box is turning, the said peripheral flanges and shield portions being in such proximity to each other that when the axle in said journal box is stationary oil will be prevented from flowing back through the space therebetween.

In testimony whereof I have signed my name to this specification.

GUSTAV STROMEIER.